United States Patent
Shimizu et al.

(10) Patent No.: US 7,512,339 B2
(45) Date of Patent: Mar. 31, 2009

(54) OPTICAL PACKET PROCESSING APPARATUS

(75) Inventors: Hiroshi Shimizu, Tokyo (JP); Chie Sato, Tokyo (JP); Yusuke Kishine, Tokyo (JP); Akira Miura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 504 days.

(21) Appl. No.: 11/288,390

(22) Filed: Nov. 29, 2005

(65) Prior Publication Data

US 2006/0140629 A1    Jun. 29, 2006

(30) Foreign Application Priority Data

Nov. 30, 2004   (JP) ................... P. 2004-346470

(51) Int. Cl.
  *H04J 14/00*  (2006.01)
  *H04J 14/08*  (2006.01)

(52) U.S. Cl. ............................ 398/53; 398/54; 398/102

(58) Field of Classification Search ................... 398/51, 398/54, 53, 102, 161
See application file for complete search history.

(56) References Cited

U.S. PATENT DOCUMENTS 6,810,211 B1 * 10/2004 Castanon ..................... 398/47
6,973,270 B2 * 12/2005 Yokoyama et al. ............ 398/57

FOREIGN PATENT DOCUMENTS

JP       6-85844 A      3/1994

* cited by examiner

*Primary Examiner*—M. R. Sedighian
(74) *Attorney, Agent, or Firm*—Sughrue Mion, PLLC

(57) ABSTRACT

In an optical packet processing apparatus, an optical coupler joins optical packets transmitted through a plurality of input side optical transmission lines and outputs the joined optical packets to an output side optical transmission line. The optical packet processing apparatus has delay sections for delaying desired optical packets for each input side optical transmission lines. Delay times of the delay sections are different by one optical packet time period, while a minimum delay time thereof is the optical packet time period or more.

8 Claims, 10 Drawing Sheets

BEFORE INPUT TO OPTICAL SWITCHES SW1, SW2

BEFORE INPUT TO OPTICAL COUPLER 11

AFTER OUTPUT FROM OPTICAL COUPLER 11

BEFORE INPUT TO OPTICAL SWITCHES SW1, SW2

BEFORE INPUT TO OPTICAL COUPLER 11

AFTER OUTPUT FROM OPTICAL COUPLER 11

BEFORE INPUT TO OPTICAL SWITCHES SW1, SW2

BEFORE INPUT TO OPTICAL COUPLER 11

AFTER OUTPUT FROM OPTICAL COUPLER 11

BEFORE JOIN

AFTER JOIN

BEFORE INPUT TO OPTICAL SWITCHES SW1, SW2

BEFORE INPUT TO OPTICAL COUPLER 11

AFTER OUTPUT FROM OPTICAL COUPLER 11

US 7,512,339 B2

OPTICAL PACKET PROCESSING APPARATUS

CROSS-REFERENCE TO RELATED APPLICATIONS

This application is based upon and claims the benefit of priority from the prior Japanese Patent Applications No. 2004-346470, filed on Nov. 30, 2004, the entire contents of which are incorporated herein by reference.

BACKGROUND OF THE INVENTION

1. Field of the Invention

The present invention relates to an optical packet processing apparatus wherein an optical coupler joins optical packets transmitted through a plurality of input side optical transmission lines and outputs the joined optical packets to an output side optical transmission line. More particularly, it relates to an optical packet processing apparatus in which even asynchronous optical packets can be fast joined as optical signals left intact, with the increase of a circuit scale suppressed.

2. Description of the Related Art

In recent years, optical communication systems which perform data communications by using optical signals have come into wide use. In such optical communication systems, packet communications are being performed likewise to those of data communications based on electric signals. The "packet communications in the data communications" are communications in which data as disassembled into cells called "packets" are transmitted and received.

A packet switch (also called "network switch") which is employed in the optical packet communications, has a plurality of optical transmission lines connected thereto and outputs inputted optical packets to a desired optical transmission line. Accordingly, the packet switch joins the optical packets from the two or more optical transmission lines, to the single optical transmission line, and it switches the paths of the optical packets and outputs the optical packets to the desired optical transmission line. Here, in joining the optical packets, it becomes important to prevent the collision between the optical packets. Incidentally, a device which processes optical packets as optical signals left intact, without converting the optical signals into electric signals, is called "optical packet switch (optical network switch)" (refer to, for example, JP-A-06-085844).

FIGS. 7A and 7B are diagrams showing the configuration of a related-art example of an optical packet processing apparatus which joins optical packets. FIG. 7A illustrates a situation before the optical packets 1 and 2 are joined, while FIG. 7B illustrates a situation after the optical packets have been joined.

Referring to FIGS. 7A and 7B, the optical packet 1 is inputted from an input port Pi1 and is transmitted through a first input side optical transmission line 100. The optical packet 2 is inputted from an input port Pi2 and is transmitted through a second input side optical transmission line 200. An optical coupler 10 is, for example, a photocoupler, and it joins the optical packets 1 and 2 from the respective input side optical transmission lines 100 and 200, to an identical output side optical transmission line 300. The output side optical transmission line 300 is connected to an output port Po1. Incidentally, it is assumed that a time at which the optical packet 1 arrives at the optical coupler 10 from the input port Pi1 is equal to a time at which the optical packet 2 arrives at the optical coupler 10 from the input port Pi2.

The operation of such an apparatus will be described.

The respective optical packets 1 and 2 are inputted at substantially the same times from the input ports Pi1 and Pi2. Besides, as shown in FIG. 7A, the respective optical packets 1 and 2 are transmitted through the optical transmission lines 100 and 200. Further, the optical packets 1 and 2 are joined by the optical coupler 10 and are transmitted through the optical transmission line 300 until they are outputted from the output port Po1. On this occasion, as shown in FIG. 7B, it is possible that the optical packets 1 and 2 will collide to destroy data, so normal packet communications might fail to proceed.

FIG. 8 is a diagram showing the configuration of another optical packet processing apparatus in the related art. Identical reference numerals are assigned to the same constituents as in FIGS. 7A and 7B, and they shall be omitted from description. Referring to FIG. 8, a repeater 20 is disposed instead of the optical coupler 10. The repeater 20 (including a network switch or a network router) includes a plurality of optical ports 21, to which optical transmission lines 100, 200 and 300 are respectively connected. Packet processing section 22 is interconnected with the respective optical ports 21. A storage area (for example, RAM) 23 is interconnected with the packet processing section 22.

The operation of such an apparatus will be described. Respective optical packets 1 and 2 are inputted from the optical transmission lines 100 and 200 to the individual optical ports 21 at substantially the same times. The optical packets 1 and 2 of optical signals as received by the optical ports 21 are respectively converted into packets 1' and 2' of electric signals, which are outputted to the packet processing section 22. Besides, the packet processing section 22 once stores at least one of the packets 1' and 2' converted into the electric signals, in the storage area 23. The packet processing section 22 outputs the packet 1' earlier to the optical port 21 to which the optical transmission line 300 is connected. Upon lapse of a predetermined time period, the packet processing section 22 reads out the packet 2' from the storage area 23 and outputs it to the optical port 21. Further, the optical port 21 reconverts the respective packets 1' and 2' of the electric signals into the optical packets 1 and 2 of the optical signals, which are outputted to the optical transmission line 300. That is, a time adjustment is made using the storage area 23, and the collision between the optical packets 1 and 2 is avoided.

FIG. 9 is a diagram showing the configuration of another optical packet processing apparatus in the related art. Identical reference numerals and signs are assigned to the same constituents as in FIGS. 7A and 7B, and they shall be omitted from description. Referring to FIG. 9, an optical switch SW1 is disposed on an optical transmission line 100, and an optical packet transmitted through the optical transmission line 100 is inputted to this optical switch. An optical transmission line 101 is connected to one output side of the optical switch SW1, while an optical transmission line 102 is connected to the other output side of the optical switch SW1.

An optical switch SW2 is disposed on an optical transmission line 200, and an optical packet transmitted through the optical transmission line 200 is inputted to this optical switch. An optical transmission line 201 is connected to one output side of the optical switch SW2, while an optical transmission line 202 is connected to the other output side of the optical switch SW2.

An optical coupler 11 is disposed instead of the optical coupler 10, and it joins the optical packets transmitted through the optical transmission lines 101 or 102 and 201 or 202, to an identical output side optical transmission line 300. The optical transmission line 102 has a transmission line length (from the optical switch SW1 to the optical coupler 11) which is greater than that of the optical transmission line 101, and it delays the optical packet in correspondence with one optical packet. Besides, the optical transmission line 202 has a transmission line length (from the optical switch SW2 to the optical coupler 11) which is greater than that of the optical transmission line 201, and it delays the optical packet in correspondence with one optical packet.

The operation of such an apparatus will be described.

In case of delaying the optical packet which is inputted from an input port Pi1 and which is transmitted through the optical transmission line 100, the optical switch SW1 selects the path of the optical transmission line 102. On the other hand, in a case where the optical packet is not to be delayed, the optical switch SW1 selects the path of the optical transmission line 101. Likewise, in case of delaying the optical packet which is inputted from an input port Pi2 and which is transmitted through the optical transmission line 200, the optical switch SW2 selects the path of the optical transmission line 202. On the other hand, in a case where the optical packet is not to be delayed, the optical switch SW2 selects the path of the optical transmission line 201.

Besides, the optical coupler 11 joins the optical packets transmitted through the optical transmission lines 101 or 102 and 201 or 202, to the optical transmission line 300 so as to output the joined optical packets from an output port Po1. That is, the optical switches SW1 and SW2 select the paths so as to delay the optical packets from the respective input ports Pi1 and Pi2 at good timings, whereby the collision between the optical packets is avoided.

Subsequently, the operation of the apparatus shown in FIG. 9 will be concretely described with reference to FIGS. 10A to 12C. FIGS. 10A to 12C are diagrams showing the relative positional relations or relative temporal relations among optical packets 1 to 4. FIGS. 10A, 11A and 12A show states before the optical packets are inputted to the optical switches SW1 and SW2, FIGS. 10B, 11B and 12B show states before they are inputted to the optical coupler 11, and FIGS. 10C, 11C and 12C show states after they have been joined by the optical coupler 11.

First, the case of FIGS. 10A to 10C will be described. The optical packets 1 to 3 are successively inputted from the input port Pi1 in this order, and are transmitted through the optical transmission line 100. On the other hand, the optical packet 4 is inputted from the input port Pi2 and is transmitted through the optical transmission line 200. Incidentally, the optical packets 2 and 4 are synchronized and inputted (refer to FIG. 10A).

When the optical packets are joined as they are, the optical packets 2 and 4 collide. Therefore, the optical switch SW1 outputs the optical packet 1 to the optical transmission line 101 and outputs the optical packets 2 and 3 to the optical transmission line 102 in order to delay them. On the other hand, the optical switch SW2 outputs the optical packet 4 to the optical transmission line 201. Thus, as shown in FIG. 10B, the delay corresponding to one optical packet as is based on the difference of the transmission line lengths of the optical transmission lines 101 and 102 develops between the optical packets 1 and 2.

Further, the optical coupler 11 joins the optical packets 1 to 4 to the optical transmission line 300. On this occasion, an interval exists between the optical packets 1 and 2, and the optical packet 4 enters the interval, so that the optical packets 1 to 4 are joined without colliding (refer to FIG. 10C).

Subsequently, the case of FIGS. 11A to 11C will be described. Although the optical packets 1 to 4 are inputted as in FIGS. 10A to 10C, the optical packets 2 and 4 are not synchronized, and the optical packets 1 and 4 are overlappingly inputted (refer to FIG. 11A). Besides, the optical switches SW1 and SW2 switch the paths as in FIGS. 10A to 10C, and the delay corresponding to one optical packet is inserted between the optical switches 1 and 2 as shown in FIG. 11B (refer to FIG. 11B).

Further, the optical coupler 11 joins the optical packets 1 to 4 to the optical transmission line 300. On this occasion, the temporal relation between the optical packets 1 and 4 has not changed, and the optical packets 1 and 4 collide (refer to FIG. 11C).

Subsequently, the case of FIGS. 12A to 12C will be described. By the way, in FIG. 9, an optical switch, and an optical transmission line for delaying the optical packet in correspondence with one optical packet are disposed on the optical transmission line 102 anew.

The optical packets 1 to 4 which are not synchronized are inputted as in FIGS. 11A to 11C (refer to FIG. 12A) The optical switch SW1 outputs all the optical packets 1 to 3 to the optical transmission line 102, and the optical switch disposed at the succeeding stage outputs these optical packets to the optical transmission line for the further delay. On the other hand, the optical switch SW2 outputs the optical packet 4 to the optical transmission line 201. Thus, as shown in FIG. 12B, each of the optical packets 1 to 3 is delayed in correspondence with two optical packets in total.

Further, the optical coupler 11 joins the optical packets 1 to 4 to the optical transmission line 300. On this occasion, since the optical packets 1 to 3 are conspicuously delayed relative to the optical packet 4, the optical packets 1 to 4 are joined without colliding. However, although the collision has been avoided, the turns of the joined optical packets 1 and 4 are reversed (refer to FIG. 12C).

JP-A-06-085844 is referred to as a related art.

In the case where the repeater 20 for converting the optical signals into the electric signals is employed for the optical packet processing apparatus as shown in FIG. 8, the optical packets 1 and 2 can be joined at the desired timings. Since, however, the packet processing is electrically performed using the packet processing section 22 and the storage area 23, processes for converting the optical packets 1 and 2 of the optical signals into the electric signals and for restoring the electric signals into the optical signals are required.

Accordingly, problems as stated below are posed.

(1) In the repeater 20, the optical packets 1 and 2 being the optical signals are converted into the electric signals, so that a predetermined time period is expended on the conversion, and a delay occurs in the transfer of the optical packets 1 and 2.

(2) As compared with the signaling speed of optical communications, the processing speed of electric processing is much lower, so that a long delay occurs when the collision of the optical packets 1 and 2 is avoided by the electric processing.

(3) In a case where an optical packet passes through a plurality of repeaters 20, the delays in the above items (1) and (2) are involved every repeater 20, so that a long time is expended on the repeaters 20, and a long transfer delay occurs.

(4) In order to realize an electric processing speed following up the signaling speed of optical signals, equipment for electric processing needs to be enlarged in scale, and this is not practical in the points of rise in cost, increase in consumption power and enlargement in the size of an apparatus.

On the other hand, in the case where all the optical packets are joined as the optical signals left intact, as shown in FIG. 9, the synchronization among all the optical packets 1 to 4 is necessitated, or the multistage delay section (the optical switch and the delaying optical transmission line) is necessitated.

(5) In the case of employing the delay section shown in FIG. 9, the synchronization among the optical packets 1 to 4 is indispensable, and it is difficult to avoid the collision between the asynchronous optical packets 1 to 4. To begin with, in an optical communication system, it is difficult in itself to perform synchronization among a plurality of input ports.

(6) Even in the apparatus shown in FIG. 9, the collision between the asynchronous optical packets 1 to 4 can really be avoided by combining the multistage delay section. The multistage delay section, however, incurs complication in a control circuit and increase in a circuit scale and leads to such problems as rise in cost, increase in consumption power and enlargement in the size of the apparatus.

SUMMARY OF THE INVENTION

An object of the present invention is to provide an optical packet processing apparatus in which even asynchronous optical packets can be fast joined as optical signals left intact, with the increase of a circuit scale suppressed.

The invention provides an optical packet processing apparatus, having: a plurality of input side optical transmission lines to which optical packets are inputted; a plurality of delay sections which are provided in correspondence with each of the input side optical transmission lines and delays a desired optical packet of optical packets inputted from a corresponding input side optical transmission line; an optical coupler where optical packets transmitted from the input side optical transmission lines through the delay sections join; and an output side optical transmission line which outputs optical packets joined in the optical coupler, wherein delay times of the delay sections are different by one optical packet time period or more with respect to each other, and a minimum delay time thereof is the optical packet time period or more.

The invention also provides an optical packet processing apparatus, having: first and second input side optical transmission lines to which optical packets are inputted; a first delay section which is provided in correspondence with the first input side optical transmission line and delays a desired optical packet of optical packets inputted from the first input side optical transmission line for a first delay time; a second delay section which is provided in correspondence with the second input side optical transmission line and delays a desired optical packet of optical packets inputted from the second input side optical transmission line for a second delay time; an optical coupler where optical packets transmitted from the first input side optical transmission line through the first delay section and optical packets transmitted from the second input side optical transmission line through the second delay section; and an output side optical transmission line which outputs optical packets joined in the optical coupler, wherein a time difference between the first delay time and the second delay time is one optical packet time period or more, and one of the first delay time and the second delay time is the optical packet time period or more.

In the optical packet processing apparatus, in a case that a plurality of first optical packets transmitted from one input side optical transmission line without delay and a second optical packet transmitted from the other input side optical transmission line without delay join in the optical coupler so that a part of the first optical packets and the second optical packet collide, the delay section corresponding to the one input side optical transmission line delays first optical packets behind a first optical packet which collides with the second optical packet, the delay section corresponding to the other input side optical transmission line delays the second optical packet, and a delay time of the delay section corresponding to the other input side optical transmission line is shorter than a delay time of the delay section corresponding to the one input side optical transmission line.

In the optical packet processing apparatus, in a case that a plurality of first optical packets transmitted from the first input side optical transmission line without delay and a second optical packet transmitted from the second input side optical transmission line without delay join in the optical coupler so that a part of the first optical packets and the second optical packet collide, the first delay section delays first optical packets behind a first optical packet which collides with the second optical packet, the second delay section delays the second optical packet, and a delay time of the second delay section is shorter than a delay time of the first delay section.

In the optical packet processing apparatus, each of the delay sections includes: a first optical transmission line; a second optical transmission line whose length is longer than that of the first optical transmission line; and an optical switch which switches a path of optical packets inputted from corresponding input side optical transmission line to the first optical transmission line or the second optical transmission line.

In the optical packet processing apparatus, the first delay sections includes: a first optical transmission line; a second optical transmission line whose length is longer than that of the first optical transmission line; and a first optical switch which switches a path of optical packets inputted from the first input side optical transmission line to the first optical transmission line or the second optical transmission line, and the second delay sections includes: a third optical transmission line; a fourth optical transmission line whose length is longer than that of the third optical transmission line; and a second optical switch which switches a path of optical packets inputted from the second input side optical transmission line to the third optical transmission line or the fourth optical transmission line.

In the optical packet processing apparatus, at least one of the first and second optical transmission lines is an optical fiber, and at least one of the third and fourth optical transmission lines is an optical fiber.

In the optical packet processing apparatus, the one optical packet time period is equal to a time period for delaying the optical packets for one optical packet, or is equal to a time period including the time period for delaying the optical packets for one optical packet and a time period of a minimum gap interval between the optical packets.

According to the optical packet processing apparatus, the delay times of the delay sections provided to the optical transmission lines differ each other by one optical packet time period or more. Besides, the minimum one of the delay times of the delay sections is one optical packet time period or more, and the delay sections avoid the collision of the asynchronous optical packets, which are thereafter joined, so that it is unnecessary to provide multistage delay sections on one optical transmission line. Moreover, the delay time which is inserted between the optical packets suffices with, at least, optical packet time periods corresponding to the number of the delay section, so that the optical packets can be joined with the short delay. Accordingly, even the asynchronous optical packets can be fast joined in optical signals left intact, with the increase of a circuit scale suppressed.

According to the optical packet processing apparatus, the time difference between the first delay time of the first delay section and the second delay time of the second delay section is one optical packet time period or more, and the first and second delay sections avoid the collision of the asynchronous optical packets, which are thereafter joined, so that it is unnecessary to provide multistage delay sections on one optical transmission line. Moreover, the first delay time which is inserted between the optical packets suffices with, at least, two optical packet time periods, so that the optical packets can be joined with the short delay. Accordingly, even the asynchronous optical packets can be fast joined in optical signals left intact, with the increase of a circuit scale suppressed.

DETAILED DESCRIPTION OF THE PREFERRED EMBODIMENTS

An embodiment of the present invention will be described with reference to the drawings.

Figure 1:
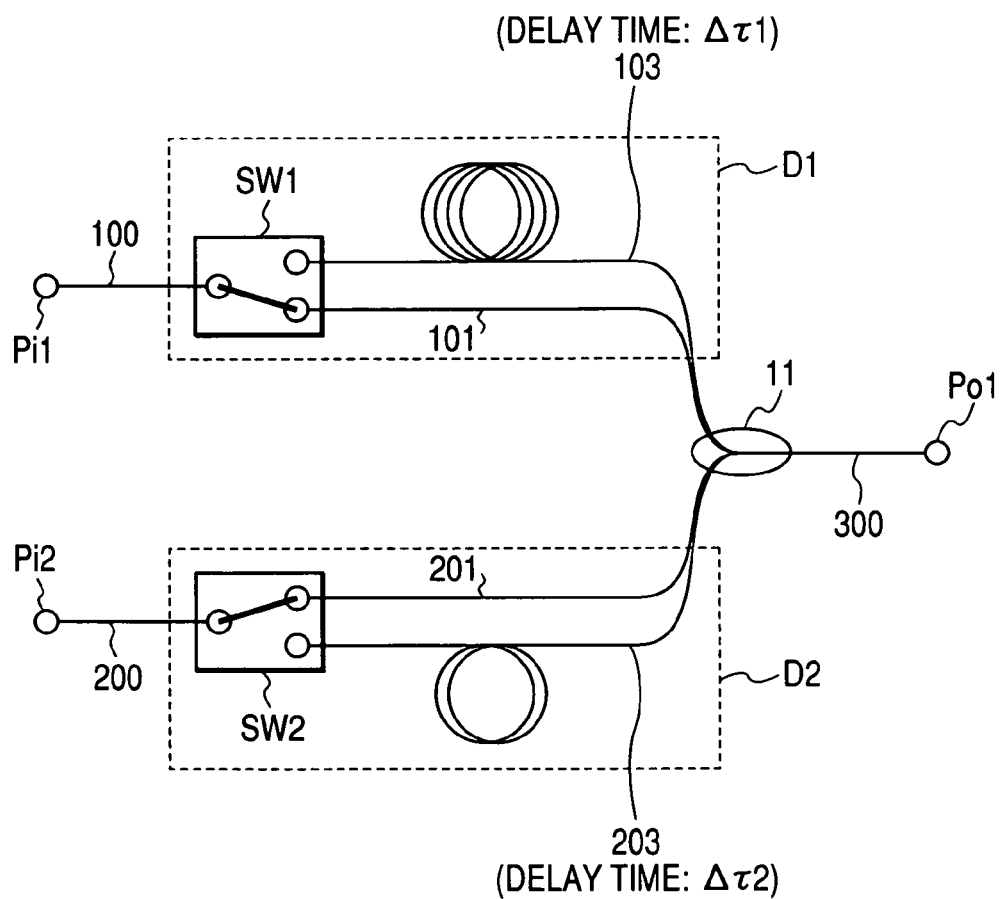
FIG. 1 is a configurational diagram showing an embodiment of the present invention.
Figure 9:
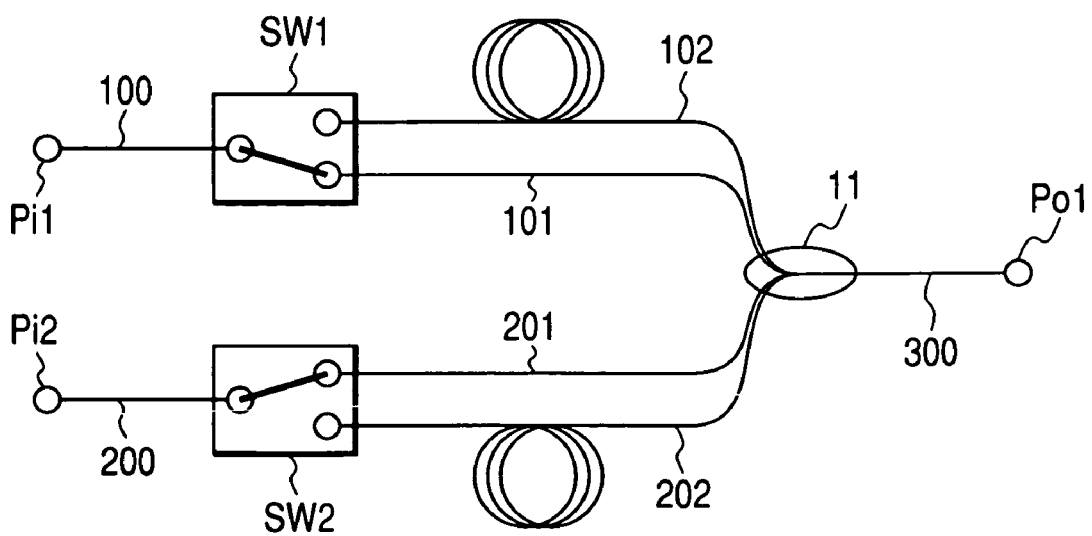
FIG. 9 is a diagram showing the configuration of another optical packet processing apparatus in the related art.

FIG. 1 is a configurational diagram showing an embodiment of the invention. Identical reference numerals and signs are assigned to the same constituents as in FIG. 9, and they shall be omitted from description. Referring to FIG. 1, an optical transmission line 103 is disposed instead of the optical transmission line 102, and an optical transmission line 203 is disposed instead of the optical transmission line 202.

Incidentally, first delay section D1 is constituted by the optical switch SW1, the first optical transmission line 101 and the second optical transmission line 103, while second delay section D2 is constituted by the optical switch SW2, the first optical transmission line 201 and the second optical transmission line 203.

For the brevity of description, it is assumed that a time period in which an optical packet proceeds from the input port Pi1 to the optical coupler 11 via the optical transmission line 101 is equal to a time period in which an optical packet proceeds from the input port Pi2 to the optical coupler 11 via the optical transmission line 201.

Besides, the transmission line length of the optical transmission line 103 (from the optical switch SW1 to the optical coupler 11) is greater than that of the optical transmission line 101, and the time difference between a time period in which the optical packet is transmitted through the optical transmission line 101 to the optical coupler 11 and a time period in which the optical packet is transmitted through the optical transmission line 103 to the optical coupler 11 is assumed to be a delay time $\Delta\tau1$.

Likewise, the transmission line length of the optical transmission line 203 (from the optical switch SW2 to the optical coupler 11) is greater than that of the optical transmission line 201, and the time difference between a time period in which the optical packet is transmitted through the optical transmission line 201 to the optical coupler 11 and a time period in which the optical packet is transmitted through the optical transmission line 203 to the optical coupler 11 is assumed to be a delay time $\Delta\tau2$. The delay time $\Delta\tau2$ delays the optical packet for, at least, one optical packet time period.

On the other hand, the delay time $\Delta\tau1$ delays the optical packet for, at least, one optical packet time period more than the maximum delay time (that is, the delay time $\Delta\tau2$) of the second delay section D2. In other words, the time difference between the delay times $\Delta\tau1$ and $\Delta\tau2$ is, at least, one optical packet time period.

Figure 2:
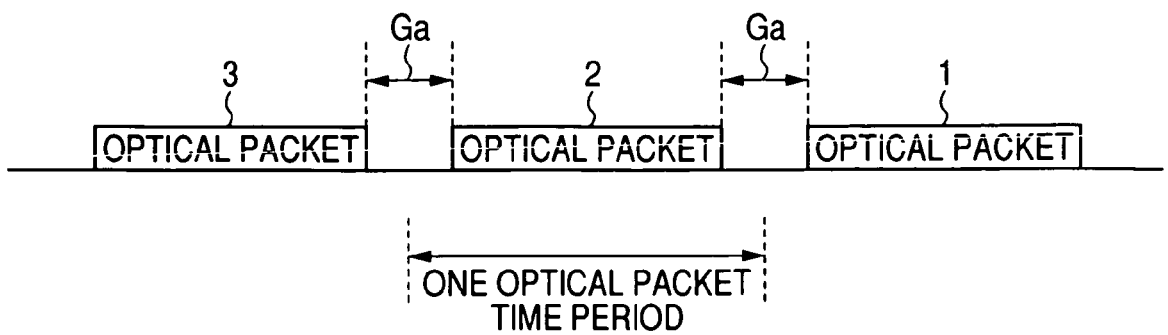
FIG. 2 is a diagram for explaining one optical packet time period.

One optical packet time period will be elucidated with reference to FIG. 2. FIG. 2 is a diagram showing the relative positional relations or relative temporal relations among optical packets 1 to 3. Referring to FIG. 2, a gap Ga is the minimum gap of gaps which are respectively set between the adjacent ones of the optical packets 1 to 3. More specifically, in an optical communication system which performs packet communications, the gaps Ga are set between the optical packets 1 to 3 as allowances for a delay control and for reception equipment which receives the optical packets 1 to 3. Accordingly, one optical packet time period has the following relation: "Time period for delaying optical packets for one optical packet" ≦ "One optical packet time period" ≦ "Time period for delaying optical packets for one optical packet + Gap Ga between optical packets." That is, the one optical packet time period signifies a time period obtained by adding the time interval of the gap Ga between the packets, to the time interval between the head bit and tail bit of the packet. In this regard, however, the gap Ga differs depending upon individual communication systems, and one optical packet time period in the case where the gap Ga is almost negligible can be regarded as being equal to the time period for delaying the optical packet in correspondence with one optical packet.

The operation of such an apparatus will be described.

First, there will be described a case where optical packets inputted from the respective ports Pi1 and Pi2 do not collide. The optical switch SW1 outputs to the optical transmission line 101 the optical packet which has been inputted from the port Pi1 and transmitted through the optical transmission line 100. On the other hand, the optical switch SW2 outputs to the optical transmission line 201, the optical packet which has been inputted from the port Pi2 and transmitted through the optical transmission line 200. Besides, the optical coupler 11 joins the optical packets delivered from the optical transmission lines 101 and 201 and outputs the joined optical packets from the port Po1 via the optical transmission line 300.

Next, there will be described a case where optical packets are successively inputted from the port Pi1 to the optical transmission line 100, where an optical packet having a sufficient interval relative to any of the first-mentioned optical packets is inputted from the port Pi2 to the optical transmission line 200, and where the optical packets from the respective ports Pi1 and Pi2 collide. The optical switch SW1 outputs to the optical transmission line 101, that one of the successively inputted optical packets which is before the insertion position of the optical packet from the port Pi2, and it outputs the optical packets behind the insertion position, to the optical transmission line 103 so as to delay these optical packets. On the other hand, the optical switch SW2 outputs that optical packet from the port Pi2 which is to be inserted between the successive optical packets from the port Pi1, to the optical transmission line 203 so as to delay this optical packet. Besides, the optical coupler 11 joins the optical packets delivered from the optical transmission lines 101, 103 and 203, and it outputs the joined optical packets from the port Po1 via the optical transmission line 300.

Besides, the optical switch SW1 switches the path onto the side of the optical transmission line 101 after the successive optical packets have passed. Further, the optical switch SW2 switches the path onto the side of the optical transmission line 201 after the optical packet has passed.

Figure 10A:
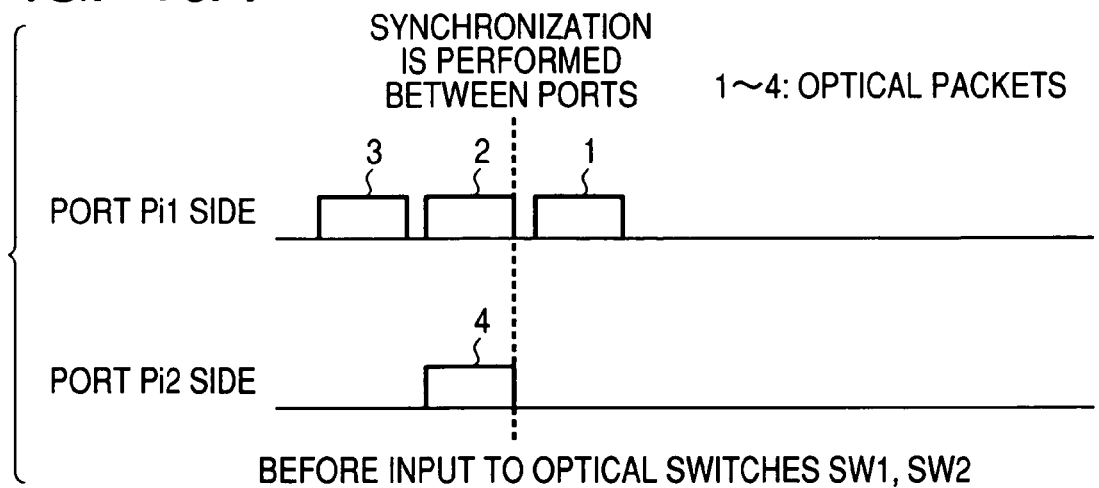
FIGS. 10A to 10C are diagrams showing an example of the relative relations among optical packets 1 to 4 in the apparatus shown in FIGS. 7A and 7B.
Figure 10B:
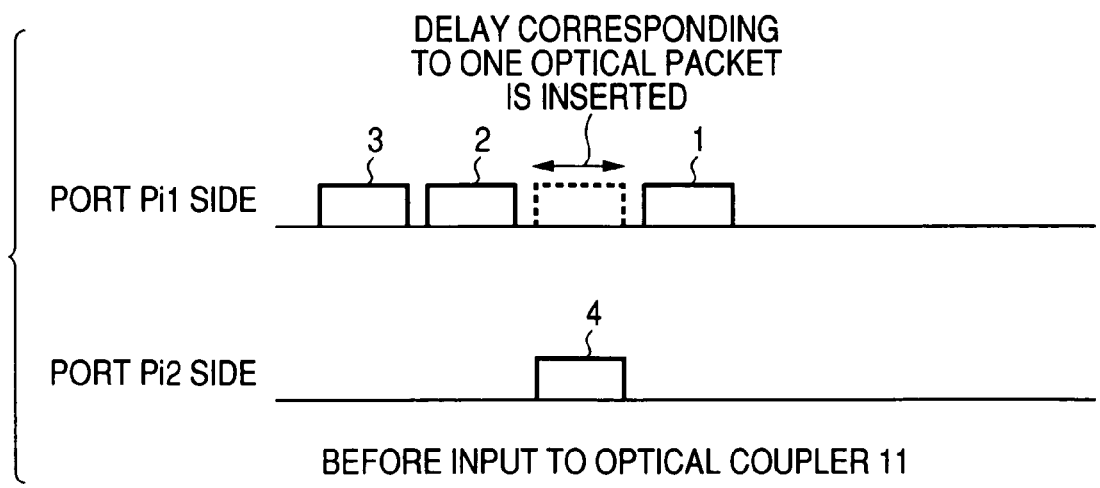
Figure 10C:
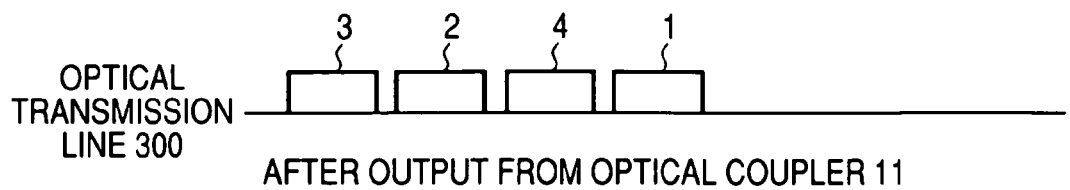
Figure 11A:
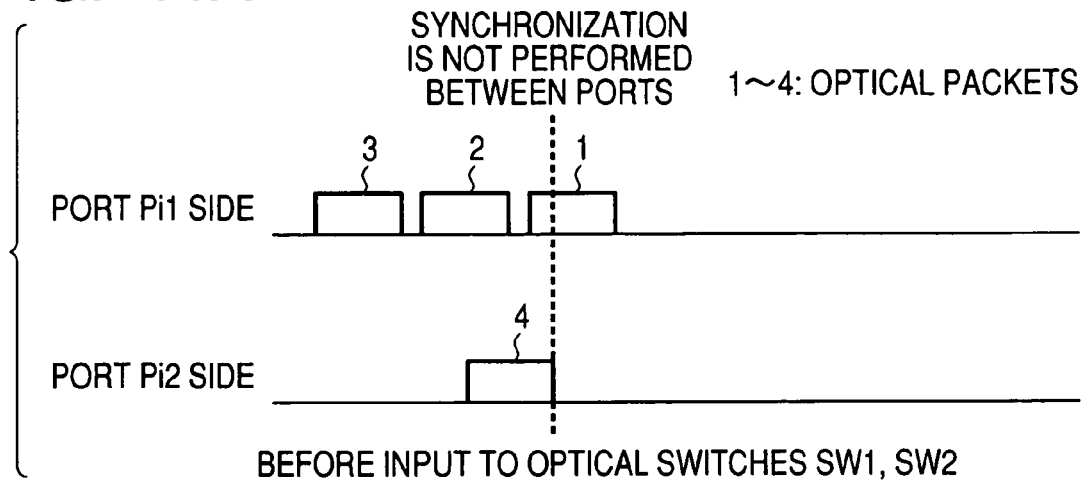
FIGS. 11A to 11C are diagrams showing another example of the relative relations among the optical packets 1 to 4 in the apparatus shown in FIGS. 7A and 7B.
Figure 11B:
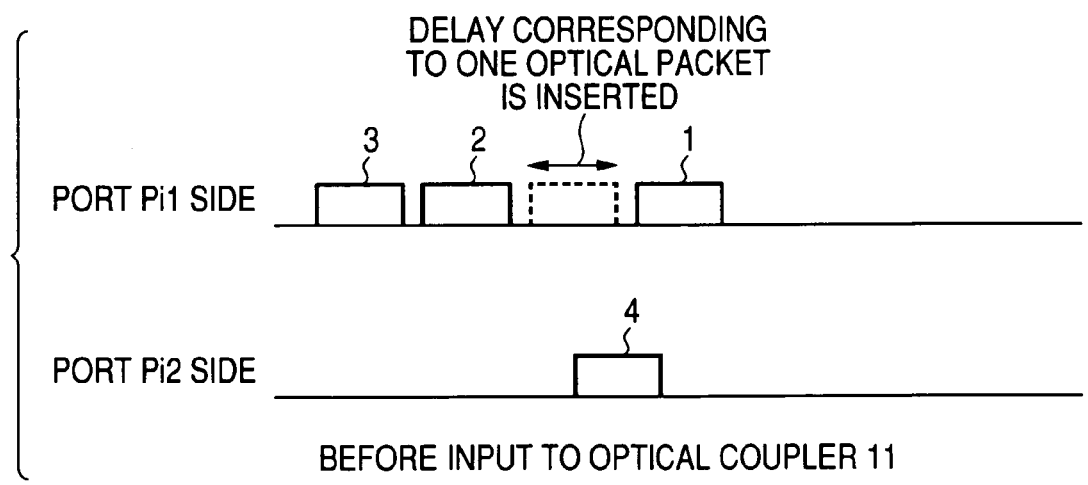
Figure 11C:
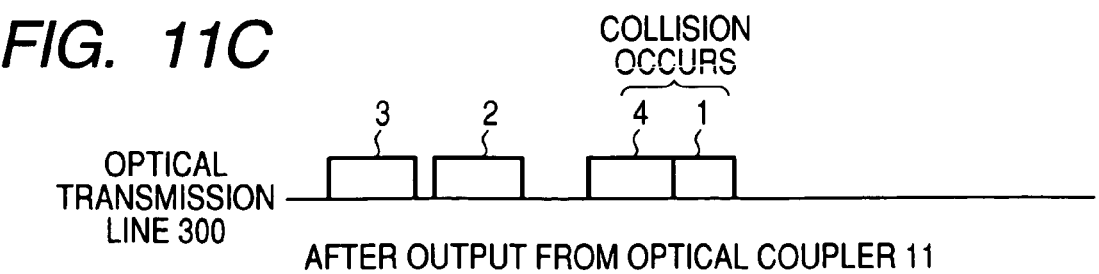
Figure 12A:
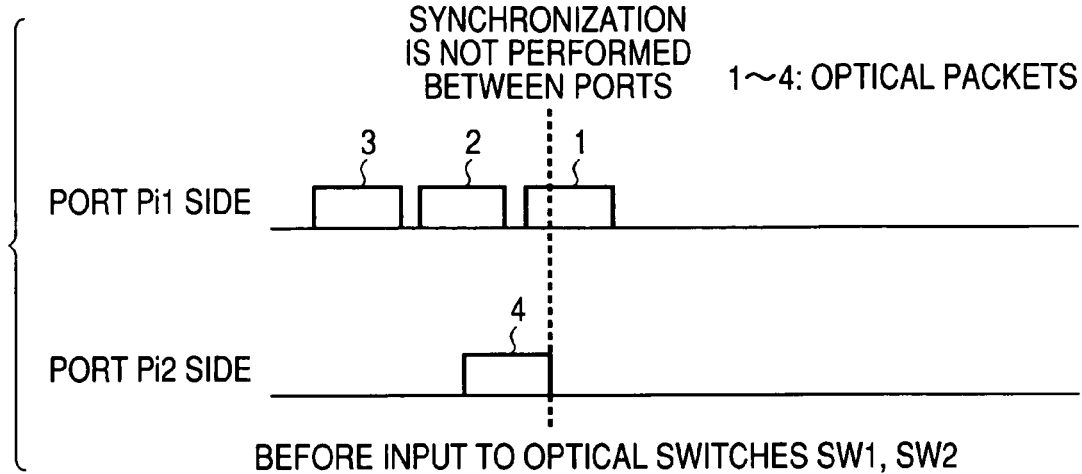
FIGS. 12A to 12C are diagrams showing another example of the relative relations among the optical packets 1 to 4 in the apparatus shown in FIGS. 7A and 7B.
Figure 12B:
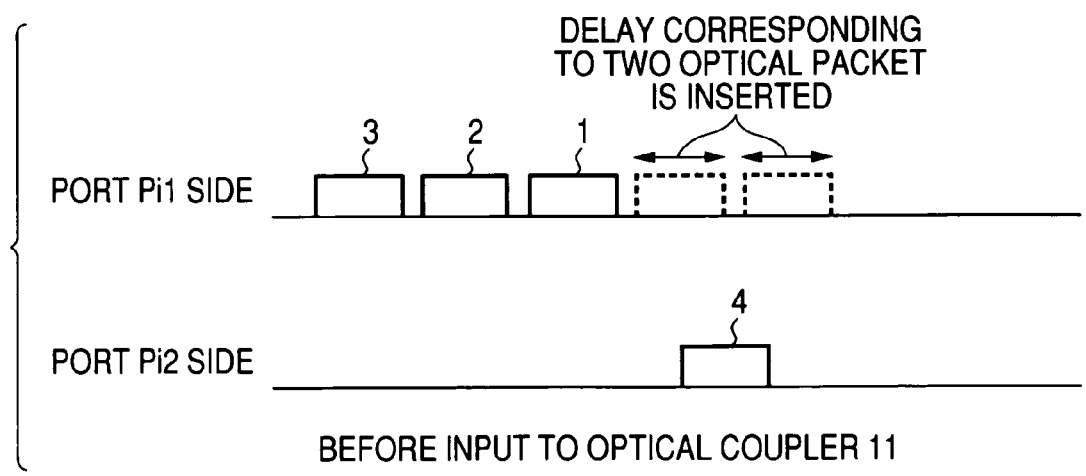
Figure 12C:
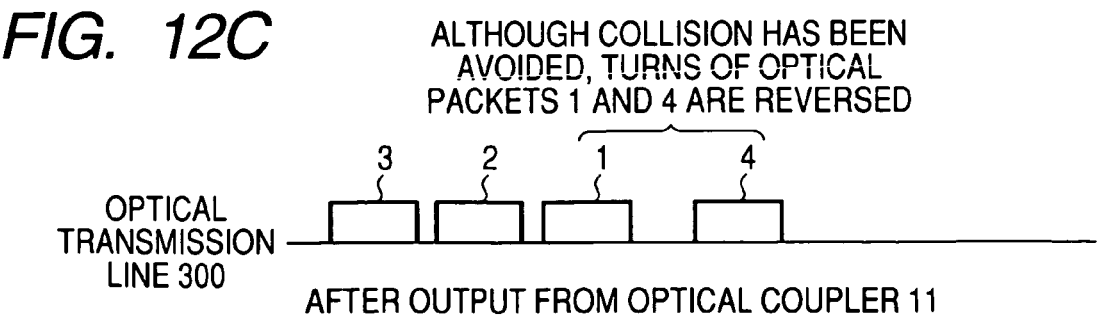

Subsequently, the operation of the apparatus shown in FIG. 1, in the case where the optical packets collide, will be concretely described with reference to FIGS. 3A to 6C. Identical reference numerals and signs are assigned to the same parts as in FIGS. 10A to 10C, and they shall be omitted from description. FIGS. 3A to 6C are diagrams showing the relative positional relations or relative temporal relations among optical packets 1 to 4.

In FIGS. 3A to 6C, the predetermined number of (exemplified to be three, in FIGS. 3A to 6C) optical packets 1 to 3 are successively inputted from the port Pi1. On the other hand, the optical packet 4 is inputted from the port Pi2. Incidentally, the port Pi2 has the next optical packet inputted thereto with a sufficient interval relative to the number of the optical packets 1 to 3 which are inputted from the port Pi1. Besides, there will be described an example in which the optical packet 4 from the side of the port Pi2 is inserted between the optical packets 1 and 2 from the side of the port Pi1.

Further, FIGS. 3A, 4A, 5A and 6A show states before the optical packets are inputted to the optical switches SW1 and SW2, FIGS. 3B, 4B, 5B and 6B show states before they are inputted to the optical coupler 11, and FIGS. 3C, 4C, 5C and 6C show states after they have been joined by the optical coupler 11.

A case where the overlap between the optical packets 1 and 4 is the greatest will be described with reference to FIGS. 3A to 3C.

The optical packets 1 to 3 are successively inputted from the input port Pi1 in this order, and are transmitted through the optical transmission line 100. On the other hand, the optical packet 4 is inputted from the input port Pi2 and is transmitted through the optical transmission line 200. Incidentally, although the heads of the optical packets 1 and 4 are in agreement, the optical packets 1 to 3 and the optical packet 4 are not synchronized (refer to FIG. 3A).

Besides, when the optical packets 1 to 4 are joined as they are, the optical packets 1 and 4 collide. Therefore, the optical switch SW1 outputs the optical packet 1 to the optical transmission line 101, and it outputs the optical packets 2 and 3 to the optical transmission line 103 in order to delay them. On the other hand, the optical switch SW2 outputs the optical packet 4 to the optical transmission line 203. Thus, as shown in FIG. 3B, the interval of the delay time $\Delta\tau1$ is inserted between the optical packets 1 and 2. Besides, the optical packet 4 is delayed in correspondence with the delay time $\Delta\tau2$.

Further, the optical coupler 11 joins the optical packets 1 to 4 to the optical transmission line 300. On this occasion, the interval exists between the optical packets 1 and 2, and the optical packet 4 enters the interval, so that the optical packets 1 to 4 are joined without colliding (refer to FIG. 3C).

Figure 4A:
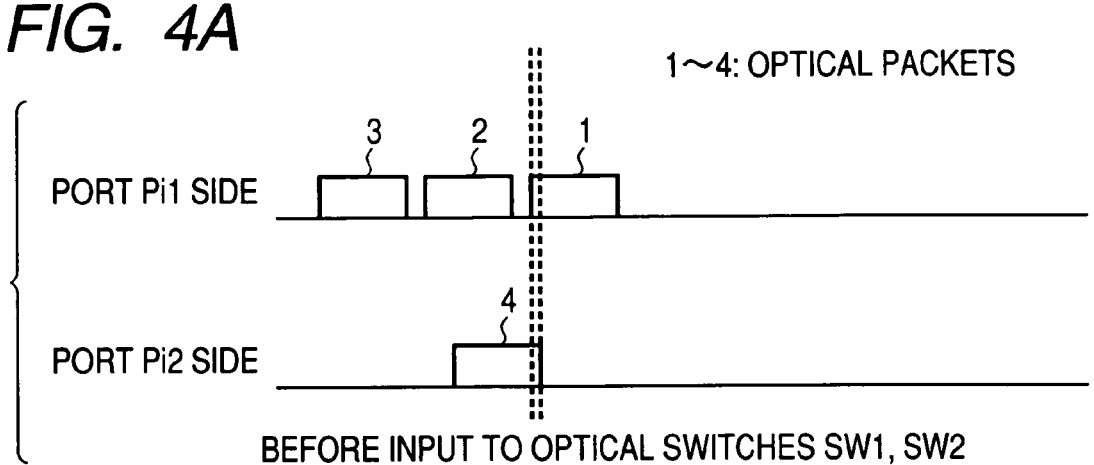
FIGS. 4A to 4C are diagrams showing another example of the relative relations among the optical packets 1 to 4 in the apparatus shown in FIG. 1.
Figure 4B:
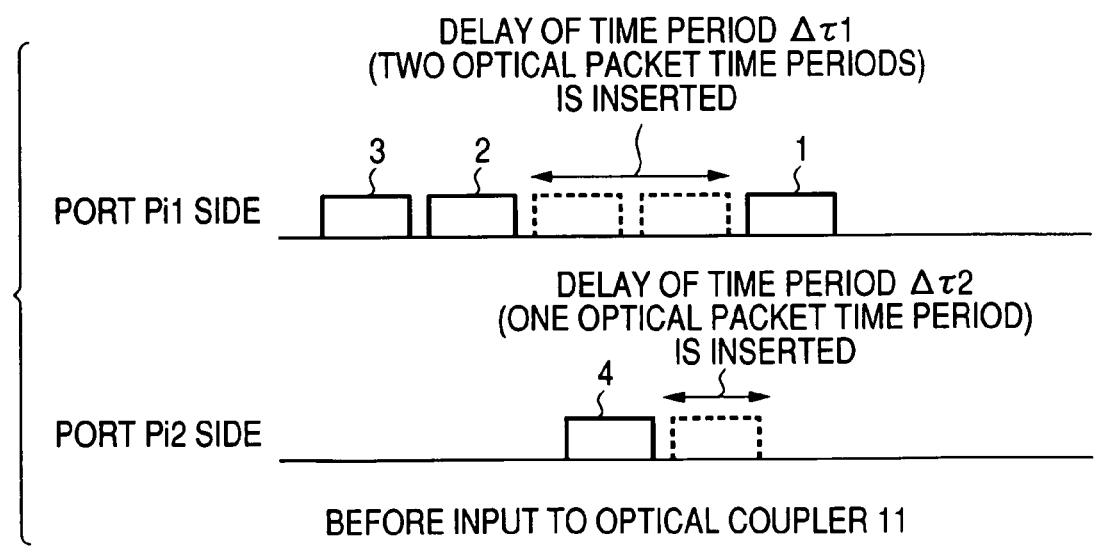
Figure 4C:
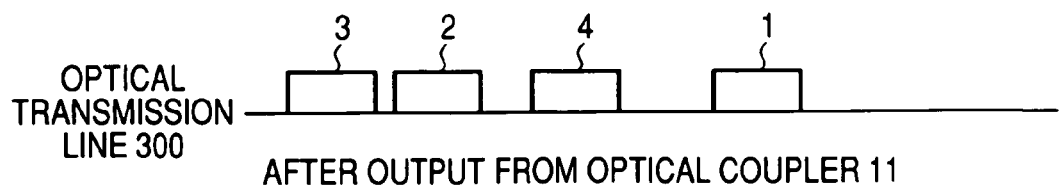

Next, a case where the overlap between the optical packets 1 and 4 is the least will be described with reference to FIGS. 4A to 4C.

Figure 3A:
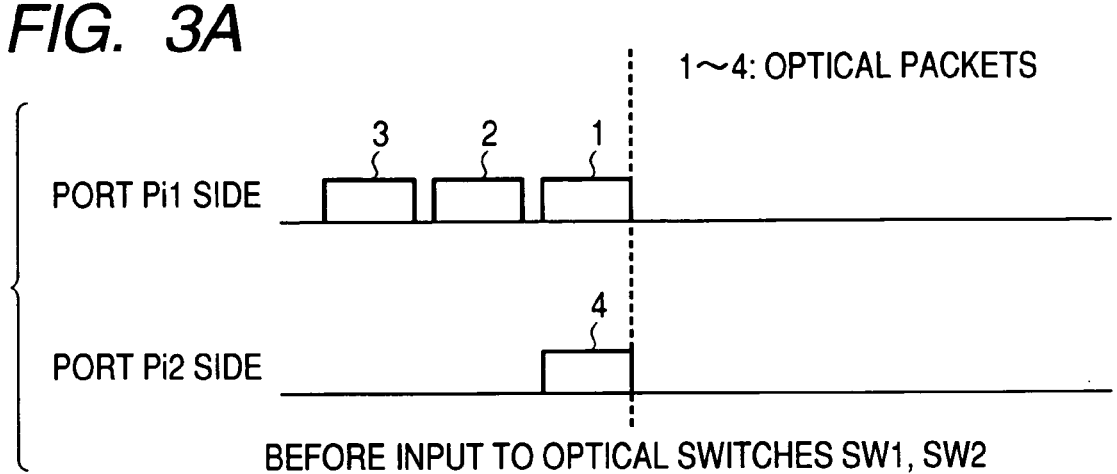
FIGS. 3A to 3C are diagrams showing an example of the relative relations among optical packets 1 to 4 in the apparatus shown in FIG. 1.
Figure 3B:
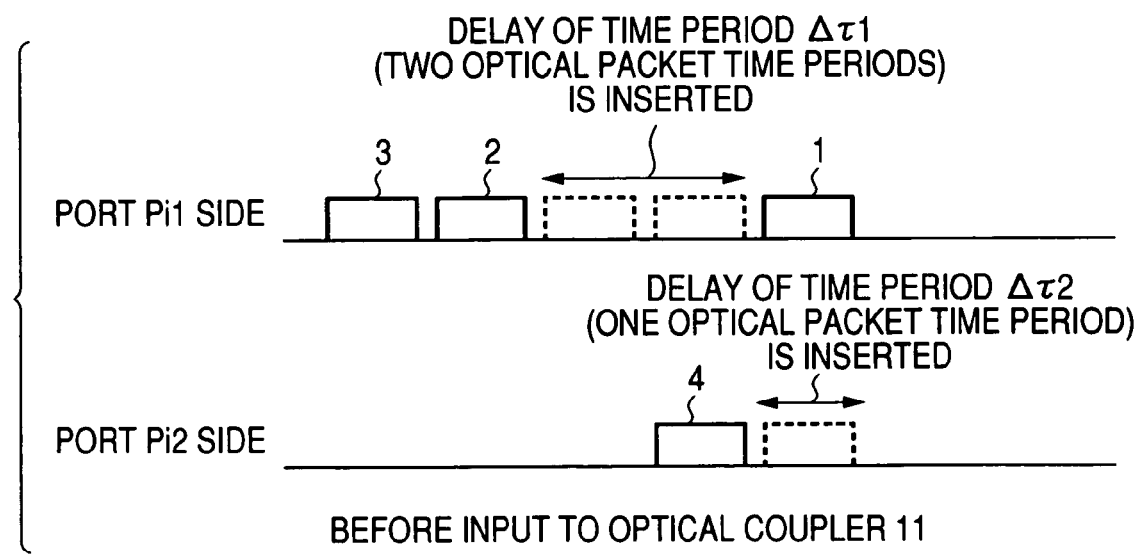
Figure 3C:
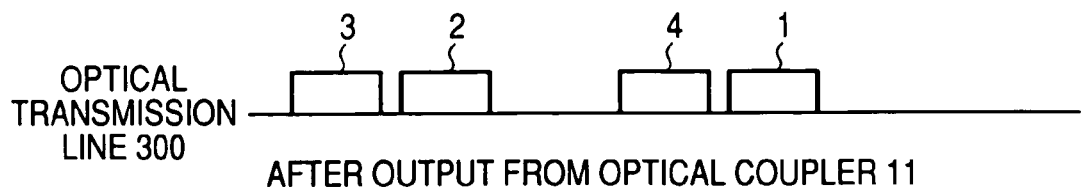

As in FIGS. 3A to 3C, the optical packets 1 to 3 are successively inputted from the input port Pi1 and are transmitted through the optical transmission line 100. On the other hand, the optical packet 4 is inputted from the input port Pi2 and is transmitted through the optical transmission line 200. Incidentally, the optical packets 1 to 3 and the optical packet 4 are not synchronized (refer to FIG. 4A).

Besides, when the optical packets 1 to 4 are joined as they are, the optical packets 1 and 2 and the optical packet 4 collide. Therefore, the optical switch SW1 outputs the optical packet 1 to the optical transmission line 101, and it outputs the optical packets 2 and 3 to the optical transmission line 103 in order to delay them. On the other hand, the optical switch SW2 outputs the optical packet 4 to the optical transmission line 203. Thus, as shown in FIG. 4B, the interval of the delay time $\Delta\tau1$ is inserted between the optical packets 1 and 2. Besides, the optical packet 4 is delayed in correspondence with the delay time $\Delta\tau2$.

Further, the optical coupler 11 joins the optical packets 1 to 4 to the optical transmission line 300. On this occasion, the interval exists between the optical packets 1 and 2, and the optical packet 4 enters the interval, so that the optical packets 1 to 4 are joined without colliding (refer to FIG. 4C).

Next, a case where the optical packet lengths of the optical packets 1 to 4 are variable lengths will be described with reference to FIGS. 5A to 5C. Incidentally, one optical packet time period in the case where the optical packet lengths are variable has the greatest packet length of the optical packets as its reference.

Figure 5A:
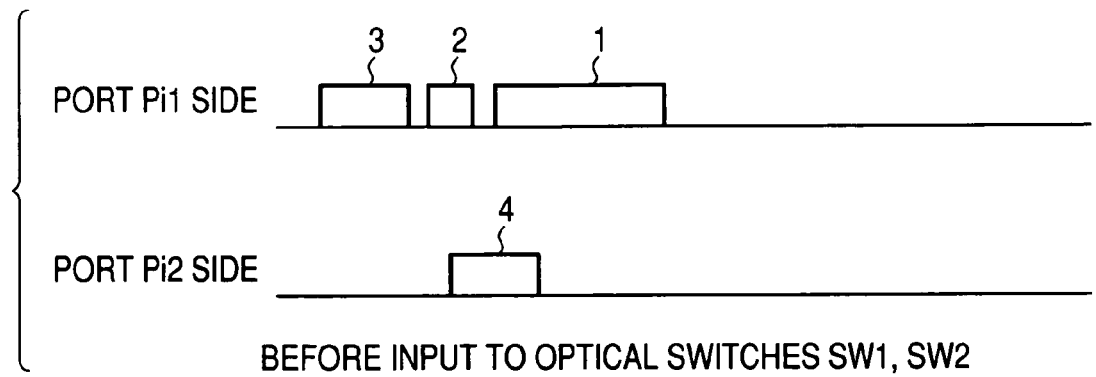
FIGS. 5A to 5C are diagrams showing another example of the relative relations among the optical packets 1 to 4 in the apparatus shown in FIG. 1.
Figure 5B:
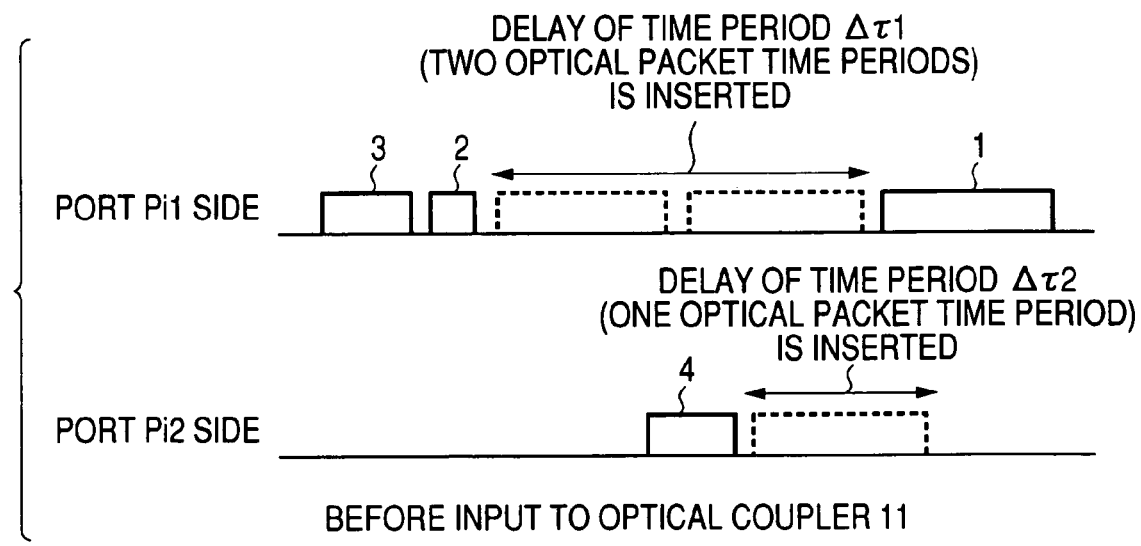
Figure 5C:
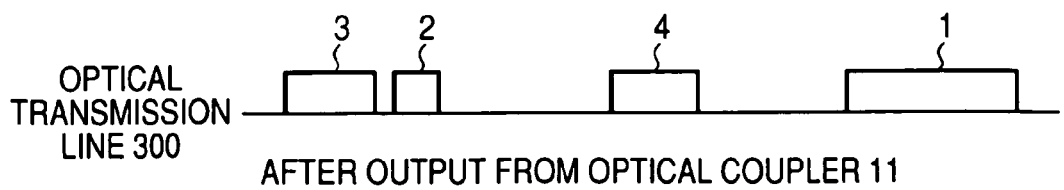

Also in FIGS. 5A to 5C, as in FIGS. 3A to 3C, the optical packets 1 to 3 are successively inputted from the input port Pi1 and are transmitted through the optical transmission line 100. On the other hand, the optical packet 4 is inputted from the input port Pi2 and is transmitted through the optical transmission line 200. Incidentally, the optical packets 1 to 3 and the optical packet 4 are not synchronized (refer to FIG. 5A).

Besides, when the optical packets 1 to 4 are joined as they are, the optical packets 1 and 2 and the optical packet 4 collide. Therefore, the optical switch SW1 outputs the optical packet 1 to the optical transmission line 101, and it outputs the optical packets 2 and 3 to the optical transmission line 103 in order to delay them. On the other hand, the optical switch SW2 outputs the optical packet 4 to the optical transmission line 203. Thus, as shown in FIG. 5B, the interval of the delay time $\Delta\tau1$ is inserted between the optical packets 1 and 2. Besides, the optical packet 4 is delayed in correspondence with the delay time $\Delta\tau2$.

Further, the optical coupler 11 joins the optical packets 1 to 4 to the optical transmission line 300. On this occasion, the interval exists between the optical packets 1 and 2, and the optical packet 4 enters the interval, so that the optical packets 1 to 4 are joined without colliding (refer to FIG. 5C).

Lastly, a case where the inter-packet gaps of the optical packets 1 to 3 are not constant will be described with reference to FIGS. 6A to 6C. Incidentally, one optical packet time period in the case where the inter-packet gaps are variable has the least gap as its reference.

Figure 6A:
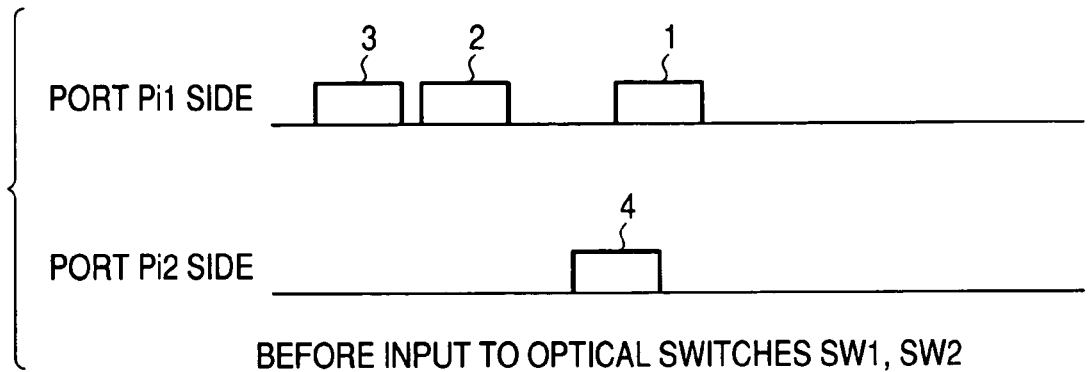
FIGS. 6A to 6C are diagrams showing another example of the relative relations among the optical packets 1 to 4 in the apparatus shown in FIG. 1.
Figure 6B:
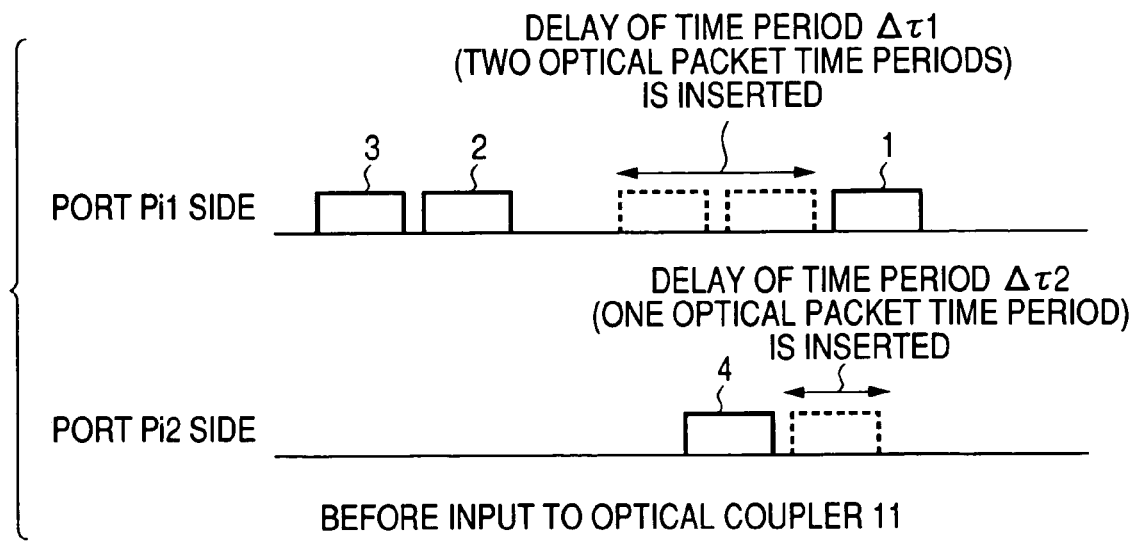
Figure 6C:
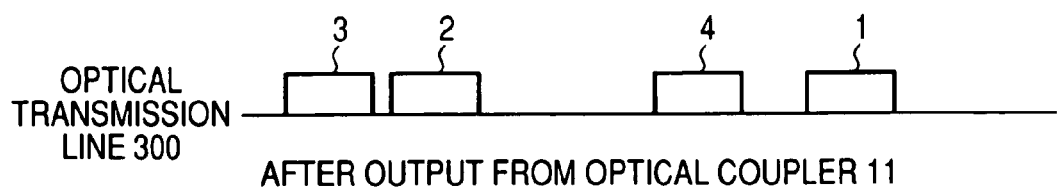
Figure 7A:
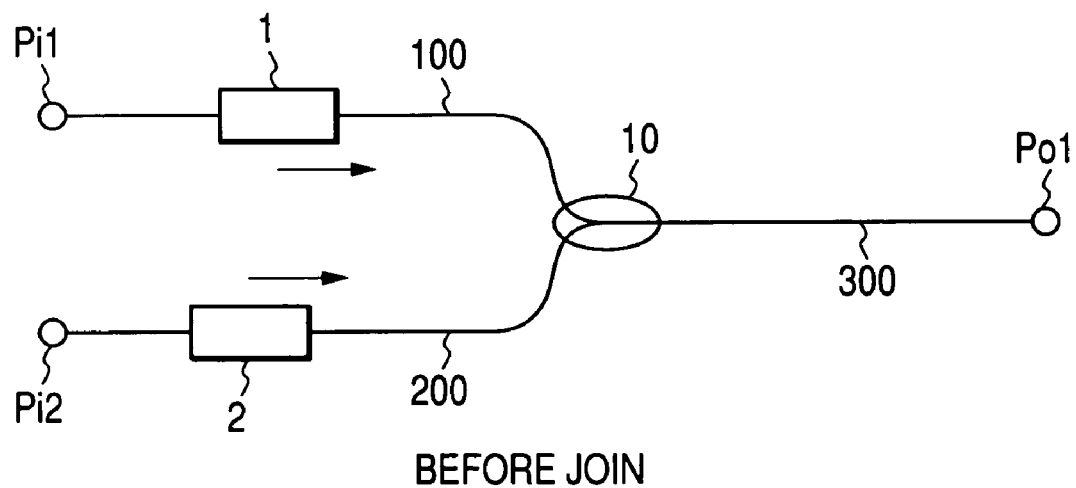
FIGS. 7A and 7B are diagrams showing the configuration of an optical packet processing apparatus in the related art.
Figure 7B:
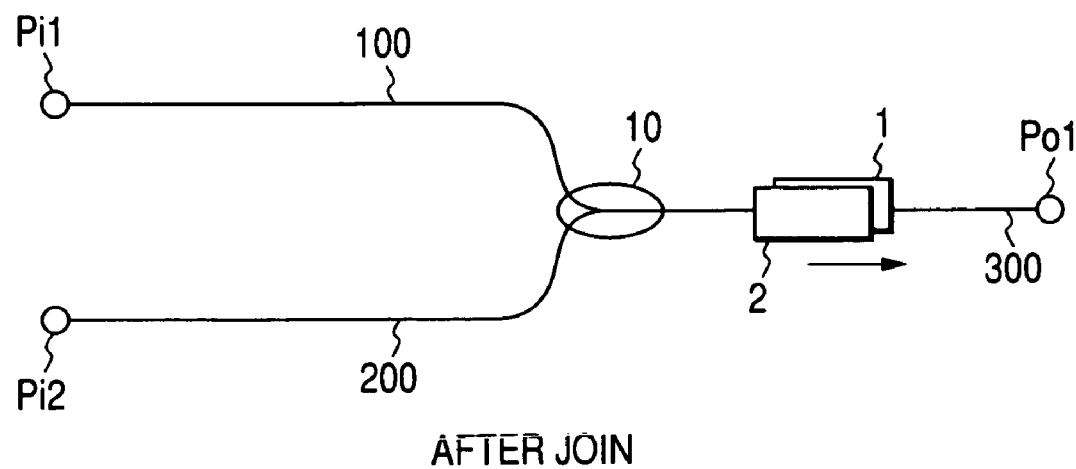

Also in FIGS. 6A to 6C, as in FIGS. 3A to 3C, the optical packets 1 to 3 are successively inputted from the input port Pi1 and are transmitted through the optical transmission line 100. On the other hand, the optical packet 4 is inputted from the input port Pi2 and is transmitted through the optical transmission line 200. Incidentally, the optical packets 1 to 3 and the optical packet 4 are not synchronized (refer to FIG. 6A).

Besides, when the optical packets 1 to 4 are joined as they are, the optical packets 1 and 4 collide. Therefore, the optical switch SW1 outputs the optical packet 1 to the optical transmission line 101, and it outputs the optical packets 2 and 3 to the optical transmission line 103 in order to delay them. On the other hand, the optical switch SW2 outputs the optical packet 4 to the optical transmission line 203. Thus, as shown in FIG. 6B, the interval of the delay time $\Delta\tau 1$ is inserted between the optical packets 1 and 2. Besides, the optical packet 4 is delayed in correspondence with the delay time $\Delta\tau 2$.

Further, the optical coupler 11 joins the optical packets 1 to 4 to the optical transmission line 300. On this occasion, the interval exists between the optical packets 1 and 2, and the optical packet 4 enters the interval, so that the optical packets 1 to 4 are joined without colliding (refer to FIG. 6C).

In this manner, the time difference between the delay times $\Delta\tau 1$ and $\Delta\tau 2$ of the delay section D1 and D2 disposed for the optical transmission lines 100 and 200, respectively, is equal to, at least, one optical packet time period, and the delay section D1 and D2 avoid the collision of the asynchronous optical packets 1 to 4, which are thereafter joined. It is therefore unnecessary to dispose multistage delay section on each of the optical transmission lines 100 and 200. Besides, the delay time $\Delta\tau 1$ which is inserted between the adjacent ones of the successive optical packets 1 to 3 suffices with, at least, two optical packet time periods, so that the optical packets 1 to 4 can be joined with the short delay. Accordingly, even the asynchronous optical packets 1 to 4 can be fast joined as the optical signals left intact, with the increase of a circuit scale suppressed.

Figure 8:
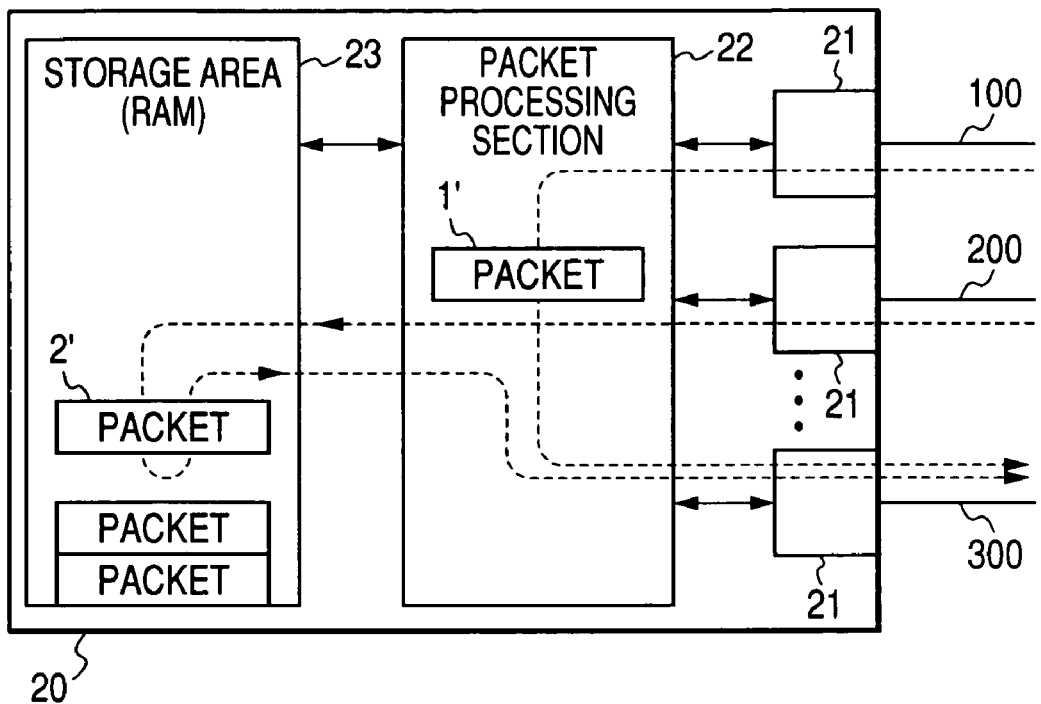
FIG. 8 is a diagram showing the configuration of another optical packet processing apparatus in the related art.

Moreover, neither the conversion nor the reconversion between the optical signals and the electric signals as shown in FIG. 8 is required, and the electric processing is unnecessary, so that the optical packets 1 to 4 can be fast joined.

Incidentally, the invention is not restricted to the foregoing embodiment, but it may well be as stated below.

Although the configuration in which the three optical packets 1 to 3 are successively inputted from the port Pi1 has been mentioned in the apparatus shown in FIG. 1, any number of optical packets may be successively inputted.

Also, although the example in which the optical packets 1 to 3 and the optical packet 4 are asynchronous has been mentioned, these packets may well be synchronized.

Besides, the configuration in which the optical packets 1 to 4 transmitted through the two input side optical transmission lines 100 and 200 are joined to the single output side optical transmission line 300 has been mentioned, but any number of input side optical transmission lines may be disposed, and the delay section disposed for the respective input side optical transmission lines may have the delay time difference of, at least, one optical packet time period therebetweeen. Besides, the minimum one of the delay times of the plurality of delay section may be, at least, one optical packet time period. This will be elucidated as to, for example, a case where three input side optical transmission lines are disposed. Letting $\Delta\tau 1$ denote the delay time of the delay section disposed on the first input side optical transmission line through which successive optical packets flow, and $\Delta\tau 2$ and $\Delta\tau 3$ denote the delay times of the delay section disposed on the second and third input side optical transmission lines through which optical packets flow with sufficient intervals, respectively, there may be set $(\Delta\tau 1-\Delta\tau 2)\geqq$(one optical packet time period), $(\Delta\tau 2-\Delta\tau 3)\geqq$ (one optical packet time period), and $(\Delta\tau 3)\geqq$(one optical packet time period).

What is claimed is:

1. An optical packet processing apparatus, comprising:
    a plurality of input side optical transmission lines to which optical packets are inputted;
    a plurality of delay sections which are provided in correspondence with each of the input side optical transmission lines and delays a desired optical packet of optical packets inputted from a corresponding input side optical transmission line;
    an optical coupler where optical packets transmitted from the input side optical transmission lines through the delay sections join; and
    an output side optical transmission line which outputs optical packets joined in the optical coupler,
    wherein delay times of the delay sections are different by one optical packet time period or more with respect to each other, and a minimum delay time thereof is the optical packet time period or more; and
    wherein in a case that a plurality of first optical packets transmitted from one input side optical transmission line without delay and a second optical packet transmitted from the other input side optical transmission line without delay join in the optical coupler so that a part of the first optical packets and the second optical packet collide,
    the delay section corresponding to the one input side optical transmission line delays first optical packets behind a first optical packet which collides with the second optical packet,
    the delay section corresponding to the other input side optical transmission line delays the second optical packet, and
    a delay time of the delay section corresponding to the other input side optical transmission line is shorter than a delay time of the delay section corresponding to the one input side optical transmission line.

2. The optical packet processing apparatus according to claim 1,
    wherein each of the delay sections includes:
    a first optical transmission line;
    a second optical transmission line whose length is longer than that of the first optical transmission line; and
    an optical switch which switches a path of optical packets inputted from corresponding input side optical transmission line to the first optical transmission line or the second optical transmission line.

3. The optical packet processing apparatus according to claim 2,
    wherein at least one of the first and second optical transmission lines is an optical fiber.

4. The optical packet processing apparatus according to claim 1,
    wherein the one optical packet time period is equal to a time period for delaying the optical packets for one optical packet, or is equal to a time period including the time period for
    delaying the optical packets for one optical packet and a time period of a minimum gap interval between the optical packets.

5. An optical packet processing apparatus, comprising:

first and second input side optical transmission lines to which optical packets are inputted;

a first delay section which is provided in correspondence with the first input side optical transmission line and delays a desired optical packet of optical packets inputted from the first input side optical transmission line for a first delay time;

a second delay section which is provided in correspondence with the second input side optical transmission line and delays a desired optical packet of optical packets inputted from the second input side optical transmission line for a second delay time;

an optical coupler where optical packets transmitted from the first input side optical transmission line through the first delay section and optical packets transmitted from the second input side optical transmission line through the second delay section; and an output side optical transmission line which outputs optical packets joined in the optical coupler, wherein a time difference between the first delay time and the second delay time is one optical packet time period or more, and one of the first delay time and the second delay time is the optical packet time period or more, and wherein in a case that a plurality of first optical packets transmitted from the first input side optical transmission line without delay and a second optical packet transmitted from the second input side optical transmission line without delay join in the optical coupler so that a part of the first optical packets and the second optical packet collide, the first delay section delays first optical packets behind a first optical packet which collides with the second optical packet, the second delay section delays the second optical packet, and a delay time of the second delay section is shorter than a delay time of the first delay section.

6. The optical packet processing apparatus according to claim 5, wherein the first delay sections includes:

a first optical transmission line;

a second optical transmission line whose length is longer than that of the first optical transmission line; and a first optical switch which switches a path of optical packets inputted from the first input side optical transmission line to the first optical transmission line or the second optical transmission line, and the second delay sections includes:

a third optical transmission line;

a fourth optical transmission line whose length is longer than that of the third optical transmission line; and a second optical switch which switches a path of optical packets inputted from the second input side optical transmission line to the third optical transmission line or the fourth optical transmission line.

7. The optical packet processing apparatus according to claim 6, wherein at least one of the first and second optical transmission lines is an optical fiber, and at least one of the third and fourth optical transmission lines is an optical fiber.

8. The optical packet processing apparatus according to claim 5, wherein the one optical packet time period is equal to a time period for delaying the optical packets for one optical packet, or is equal to a time period including the time period for delaying the optical packets for one optical packet and a time period of a minimum gap interval between the optical packets.

* * * * *